United States Patent
Shirakawa

(10) Patent No.: US 8,581,747 B2
(45) Date of Patent: Nov. 12, 2013

(54) PEDESTRIAN SUPPORT SYSTEM

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 706 days.

(21) Appl. No.: 12/557,152

(22) Filed: Sep. 10, 2009

(65) Prior Publication Data

US 2009/0322566 A1 Dec. 31, 2009

Related U.S. Application Data

(63) Continuation of application No. PCT/JP2007/056306, filed on Mar. 27, 2007.

(51) Int. Cl.
| | |
|---|---|
| G08G 1/095 | (2006.01) |
| H04Q 5/22 | (2006.01) |
| G08B 13/14 | (2006.01) |
| G08B 1/08 | (2006.01) |
| G01C 21/30 | (2006.01) |
| A45B 1/00 | (2006.01) |
| A45B 5/00 | (2006.01) |
| A45B 21/00 | (2006.01) |
| G06F 17/00 | (2006.01) |
| G06K 7/08 | (2006.01) |

(52) U.S. Cl.
USPC .. 340/944; 340/10.1; 340/572.1; 340/539.13; 701/208; 701/211; 135/65; 135/66; 135/17; 235/375; 235/449

(58) Field of Classification Search
USPC ............. 340/573.1, 573.4, 572.1, 572.9, 505, 340/10.1, 5.92, 988, 539.1, 539.13, 568.1, 340/825.49, 825.69, 10.4; 342/357, 386, 342/457; 235/385, 375; 705/22, 28, 14.64
See application file for complete search history.

(56) References Cited

U.S. PATENT DOCUMENTS

2003/0060978 A1\* 3/2003 Kokojima et al. ............ 701/211
2003/0187800 A1\* 10/2003 Moore et al. .................... 705/52

(Continued)

FOREIGN PATENT DOCUMENTS

| JP | 2144800 | 6/1990 |
|---|---|---|
| JP | 10206183 | 8/1998 |

(Continued)

OTHER PUBLICATIONS

International Search Report dated Jul. 3, 2007.

(Continued)

Primary Examiner — Jennifer Mehmood
Assistant Examiner — Mirza Alam
(74) Attorney, Agent, or Firm — Smith, Gambrell & Russell, LLP

(57) ABSTRACT

Disclosed is a pedestrian support system that supports the movement of a pedestrian through the use of tags. This pedestrian support system comprises: a plurality of tags having an information storage unit and that are placed on a cable that extends over a traveled path; a guide device that is held by a pedestrian that is traveling along a sidewalk and that is capable of non-contact communication with the tags, and a central control device, comprising a database in which tag map information is recorded, that uses that tag map information to creates path information having tag IDs that are in the order of tags that are located along a path from a starting location to a destination location and directly or indirectly sets that path information in the guide device. The guide device reads the tag IDs from the tags, compares the read tag IDs with the tag IDs in the path information to identify the location on the path where the pedestrian is walking, and provides information such as advancement direction to support the movement of the pedestrian.

13 Claims, 13 Drawing Sheets

(56) References Cited

U.S. PATENT DOCUMENTS

| | | | |
|---|---|---|---|
| 2005/0010497 A1* | 1/2005 | Kinjo | 705/27 |
| 2005/0030176 A1* | 2/2005 | Wagner | 340/539.13 |
| 2005/0060088 A1* | 3/2005 | Helal et al. | 701/208 |
| 2005/0099306 A1* | 5/2005 | Gilfix et al. | 340/573.1 |
| 2006/0129308 A1* | 6/2006 | Kates | 701/200 |
| 2006/0289624 A1* | 12/2006 | Olmos et al. | 235/375 |
| 2007/0159332 A1* | 7/2007 | Koblasz | 340/572.1 |
| 2009/0132158 A1* | 5/2009 | Sironi et al. | 701/200 |

FOREIGN PATENT DOCUMENTS

| | | |
|---|---|---|
| JP | 11353577 | 12/1999 |
| JP | 2001155287 | 6/2001 |
| JP | 2001190589 | 7/2001 |
| JP | 2002163759 | 6/2002 |
| JP | 2002170191 | 6/2002 |
| JP | 2003148990 | 5/2003 |
| JP | 2004309305 | 11/2004 |
| JP | 2005167863 | 6/2005 |
| JP | 2005351877 | 12/2005 |
| JP | 2006163655 | 6/2006 |
| WO | 2006045819 A2 | 5/2006 |

OTHER PUBLICATIONS

Extended European Search Report dated Mar. 21, 2013 issued in the European Application No. 07739744.6-1810 / 2131148.

* cited by examiner

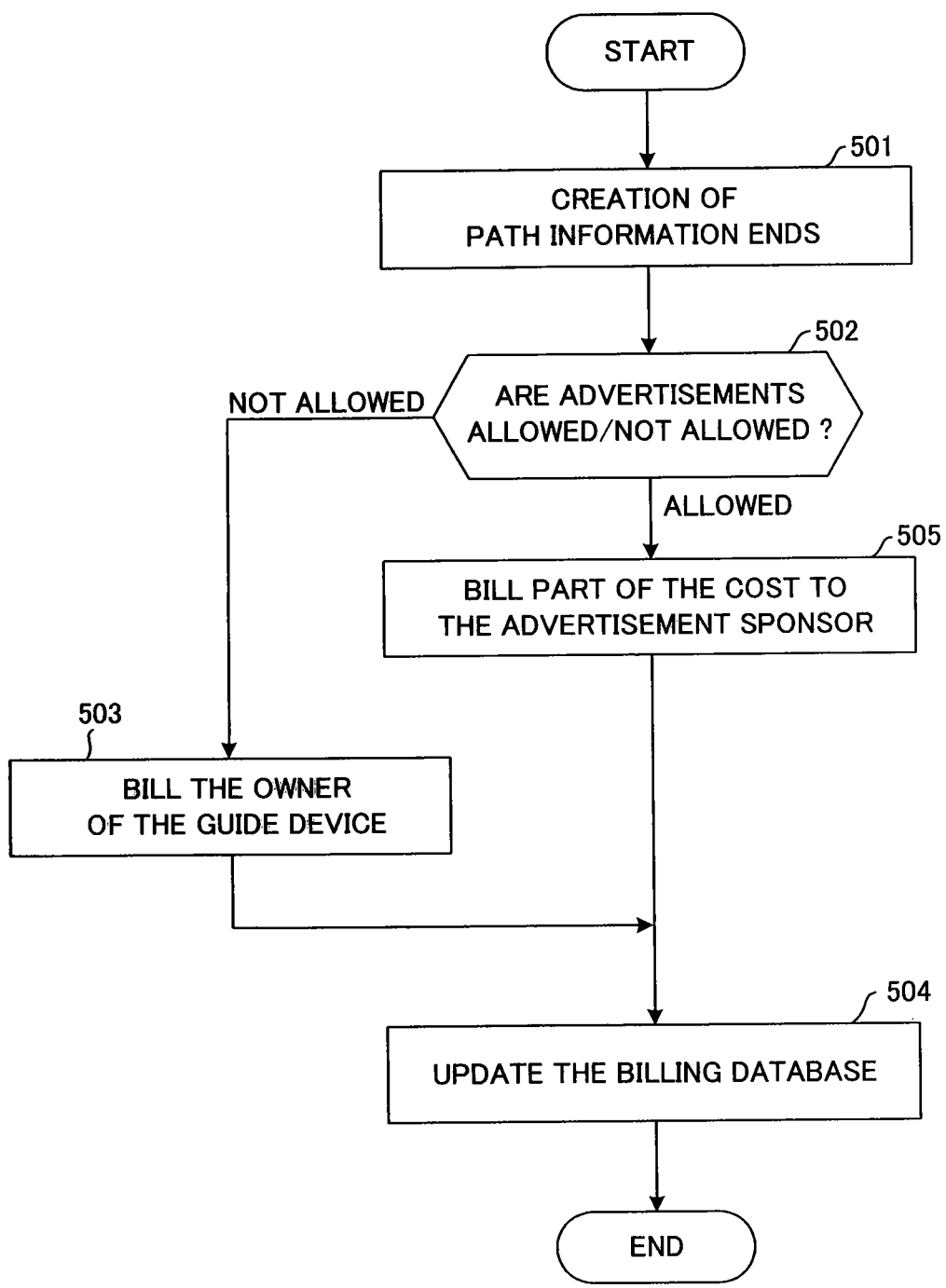

PEDESTRIAN SUPPORT SYSTEM

CROSS-REFERENCE TO RELATED APPLICATIONS

This application is a continuation application of international PCT application No. PCT/JP2007/056306 filed on Mar. 27, 2007.

BACKGROUND OF THE INVENTION

The present invention relates to a pedestrian support system, and more particularly to a pedestrian support system that uses a non-contact tag to support the movement of pedestrians.

A pedestrian support system that uses a non-contact tag to support the movement of a pedestrian has been proposed. This first form of related art (Japanese patent application JP2004-309305A) is a pedestrian support system that is capable of guiding a pedestrian by placing tags that contain direction information on a road surface, and having a non-contact reader that is in the possession of the pedestrian read these tags. This pedestrian support system comprises: (1) a plurality of tags that have an information storage means and that are placed in a linear or planar arrangement on a road, (2) a tag reader that is in the possession of a pedestrian and that is capable of non-contact communication with the tags, and (3) a guidance means that provides information from the tag reader to the pedestrian.

A second form of related art (Japanese patent application JP2006-163655A) is an evacuation guidance system that, in times of emergency, through performing radio communication with cellular phones by using leakage coaxial cable, is capable of providing the most suitable evacuation guidance. This evacuation guidance system comprises: (1) leakage coaxial cable that, together with being installed in facilities such as underground passages, is mounted with IC tags at appropriate intervals, (2) an evacuation guidance device that is connected to the leakage coaxial cable and handles trouble in times of emergency, and (3) a cellular telephone device with an emergency drive feature that enables radio communication with the evacuation guidance device via the IC tags and leakage coaxial cable. During an emergency, evacuation guidance is possible by performing radio communication between the evacuation guidance device and cellular telephone via the IC tags and leakage coaxial cable.

A third form of related art (Japanese patent application JP2005-167863A), is a guidance system that guides a user through the use of IC tags, and comprises a user terminal with a built-in IC tag communication device, and a plurality of access terminals that are located in a scattered arrangement at specified locations, wherein an access terminal comprises an IC tag that performs close-range radio communication with the user terminal and a control device that controls the transmission and update of information that is stored in the IC tag by performing communication with a server system over a specified communication line. The server system transmits guidance information to a specified access terminal that was selected from among the plurality of access terminals, then the selected access terminal stores the transmitted guidance information in the IC tag of that access terminal and the user terminal receives the guidance information from that IC tag by performing close-range radio communication with the IC tag of the selected access terminal.

The pedestrian support system of the first form of related art has IC tags that are located in a linear or planar arrangement on a road surface, so when signboards or parked bicycles are lined along a sidewalk, a signal from a tag or a signal to a tag may become blocked by these objects and it will be impossible to perform normal communication between that tag and a tag reader. Therefore, the support system is limited in its use when supporting a handicapped person, particularly, a person with poor eyesight.

The second form of related art requires the installation of leakage coaxial cable as an information transmission means, and installation over a large area such as a road would be extremely costly, and thus would be very difficult to accomplish.

The third form of related art provides information from a plurality of access terminals that are dispersed at specified locations to a user terminal via IC tags, but does not support the movement of a pedestrian, and particularly a pedestrian with poor eyesight.

SUMMARY OF THE INVENTION

From the above, it is the object of the present invention is to provide a pedestrian support system that reads signals from tags even though objects such as signboards or parked bicycles are arranged along the movement path (hereafter this path will be referred to as a sidewalk).

Another object of the present invention is to provide a pedestrian support system that creates path information having tag IDs that are arranged in the order of tags that are located along a path to a desired destination location, sets that information in a guide device that is in the possession of the pedestrian, and guides the pedestrian to the desired destination location by referencing the path information and the tag IDs that are read from the tags.

Moreover, another object of the present invention is to provide a pedestrian support system that, when an obstacle such as construction or an accident occurs on the sidewalk that a pedestrian is traveling over, can detect this obstacle and automatically update the tag map information at a central control center, then create path information based on the latest sidewalk information and supply it to a guide device.

Another object of the present invention is to a provide pedestrian support system that, when an actually read tag ID differs from the tag ID that was estimated from the path information, finds a new path to the desired destination location and sets that path information in the guide device.

Furthermore, another object of the present invention is to provide a pedestrian support system, wherein when the guide device is in an area where advertisements that are recorded on the tags or the like are allowed, the advertiser is billed for part of the cost for providing the path information (including the full amount for system construction, maintenance, management, etc.), and when the guide device is in an area where advertisements are not allowed, the owner of the guide device will be billed for the full cost for providing the path information.

The present invention is a pedestrian support system that supports the movement of a pedestrian using tags, comprising: a plurality of tags having an information storage unit that are placed on cables that extend over a sidewalk; a guide device that is held by a pedestrian traveling on the sidewalk and is capable of non-contact communication with the tags; and a central control device having a database in which tag map information is recorded, and that using that tag map information, creates path information having tag IDs that are in the order of tags that are along a path from a starting location to a destination location and directly or indirectly sets that path information in the guide device; wherein the guide device reads tag IDs from the tags and compares those tag IDs with the tag IDs in said path information in order to identify where on the path the pedestrian is moving, then provides information to support the movement of the pedestrian based on that path information.

When handicap information about the owner of the guide device is input together with the destination location information, the central control device creates path information that takes into consideration that handicap.

The pedestrian support system comprises local information control devices that are placed on constructs such as power poles along a sidewalk, and that act as a go-between for communication between the central control device and the tags, and between the central control device and guide device. The local information control device reads information such as the type, scale, and location information about an event from a tag that is built into a marker that is placed at a construction site, accident site or the like and sends that information to the central control device, and the central control device updates the tag map information based on that information.

The guide device estimates the next tag ID from the path information, and when this estimated tag ID differs from the tag ID that is actually read from a tag, attaches the read tag ID and requests the central control device to reroute the path, then considering handicap information or else of the user of the guide device the central control device finds the best new path from the location of the notified tag ID to the destination location and sends the difference between the old path information and new path information to the guide device; after which the guide device updates the path information that it has based on that difference.

Control is performed such that advertisement information or key information that allows advertisements is recorded in a second information storage area of a tag, and in an area where advertisements are allowed, said guide device reads the advertisement information from that second information storage area of that tag and provides the advertisement information to the pedestrian, and in an area where advertisements are not allowed, said guide device does not provide advertisement information to the pedestrian. The central control device comprises a billing database that records billing data for billing the owner of the guide device and the advertiser for the cost of providing path information (including construction, maintenance and management costs of the system), and bills the advertiser for part of the cost for providing path information for areas where the guide device allows advertisements, and bills the owner of the guide device for the entire cost for providing path information for areas where the guide device does not allow advertisements.

BRIEF DESCRIPTION OF THE DRAWINGS

FIG. 13 is a flowchart for a billing process.

DESCRIPTION OF THE PREFERRED EMBODIMENTS (A) Construction of the Pedestrian Support System FIG. 1 is a schematic diagram of the pedestrian support system of the present invention, wherein power poles PPL are installed along a movement path WRD (hereafter referred to as a sidewalk) such as a sidewalk, and a power line ECL that supplies electrical power is supported by these power poles. In other words, the power line ECL extends in the air above the sidewalk, and a plurality of RFID tags TG having an information storage unit (RAM) are placed at specified intervals along the power line ECL. Power is supplied to the tags from the power line ECL, and when there is a request from a tag reader to read a tag, the information that is stored in the RAM is read and supplied to the tag reader, or when there is a request from the tag reader to write information to a tag, data is written to the RAM. Each tag comprises a unique identifier (tag ID) that is saved in RAM such that uniqueness can be maintained for a specified service area.

Figure 1:
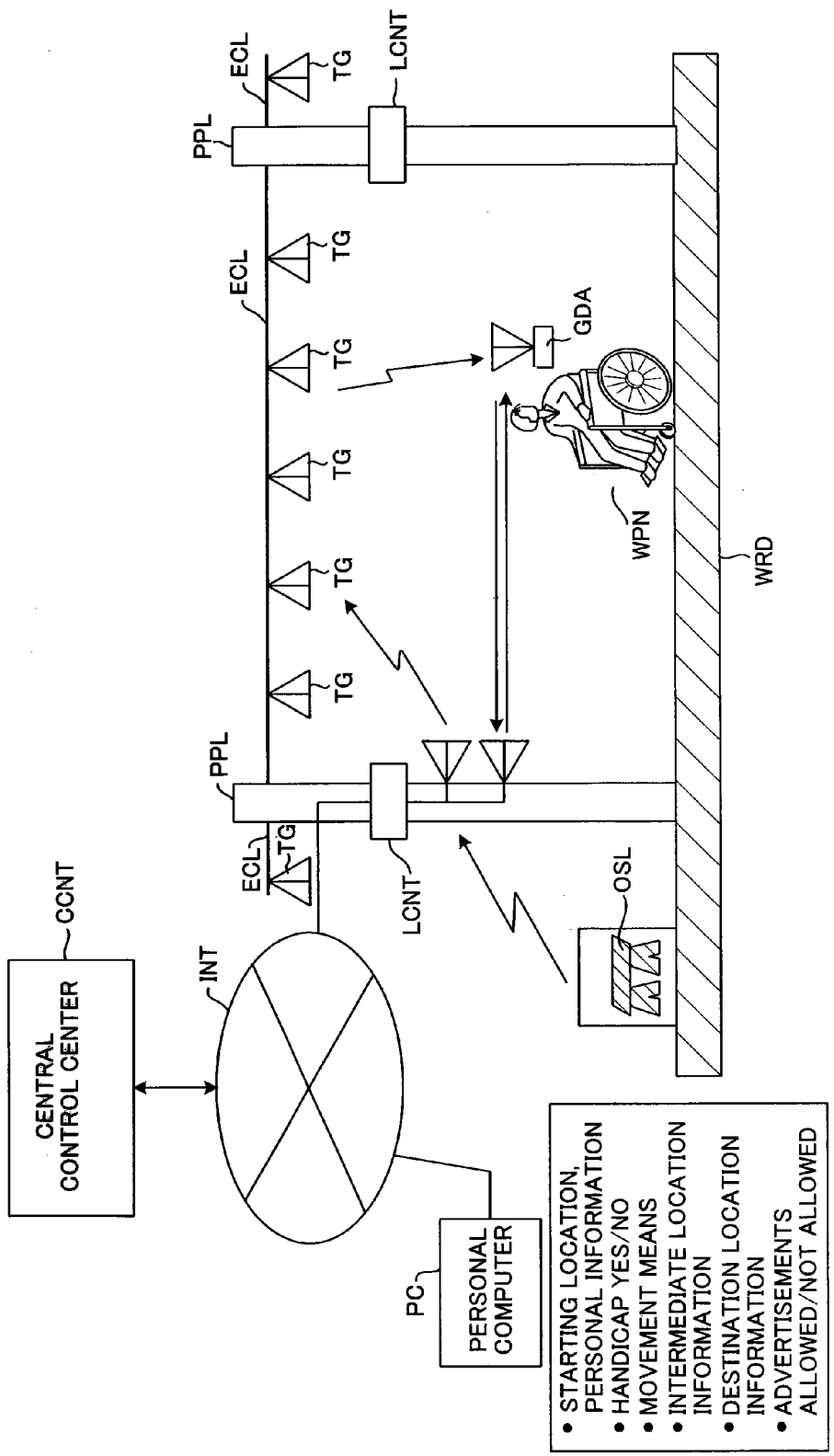
FIG. 1 is a schematic diagram of the pedestrian support device of the present invention.

A central control center CCNT contains map information (called tag map information) that is created from the tags (tag IDs) for each service area. The tag map information is the same type as the map information used in car navigation, where each tag is a node and comprises the connection relationship, right/left turn information and the like for that tag. The central control center CCNT uses the tag map information to create path information having tag IDs that are arranged in the order of the tags that are located along the path from the starting point location to the desired destination location, and directly or indirectly sets that path information in the guide device GDA.

The guide device GDA is in the possession of a pedestrian WPN that moves along a sidewalk, and comprises a tag reader that is capable of non-contact communication with the tags TG, and with the path information that was created by the central control center CCNT being set in the memory thereof, the guide device GDA uses that path information and the tag IDs that are read from the tags TG to provide pedestrian support information (right/left turn information, etc.). That is, the guide device GDA reads a tag ID from a tag and compares that tag ID with a tag ID in the path information to identify which point on the path the pedestrian is at, and based on that path information provides information that supports the movement of the pedestrian as audio information such as a voice, or visual information such as an arrow display.

The local information control devices LCNT are placed on constructs such as power poles PPL that are located along the sidewalk, and they write information such as a tag ID that is specified from the central control device CCNT to a tag. Moreover, the local information control device LCNT functions as a go between for the communication between the central control device CCNT and guide device GDA. Furthermore, the local information control device LCNT comprises a function that reads information such as the type, scale, location of an event from a tag that is built-into a marker (triangular cone, barricade or the like) OSL that is placed at a construction site or site of an accident and send the information to the central control center CCNT center, and the central control center updates the tag map information in its database based on that information. In order to read information from the tag that is built into a marker OSL, the manager at the construction site must activate the tag function (this is in order to prevent pranks, vandalism and the like).

The central control center CCNT and the local information control device LCNT can, for example, be connected such that they can communicate over the Internet INT, however, they can also be constructed such that they can communicate directly using PLC (Power Line Communication) technology without being connected to the Internet.

The pedestrian uses a personal computer PC (or any information terminal which can achieve alternate function instead of PC) that he or she can operate to connect to the central control center CCNT over the Internet, requests the central control center to find a path from a starting location to a destination location, acquires and stores the path information that was found, and then by suitably connecting the guide device GDA to the personal computer PC, transfers and stores the path information in the memory of the guide device GDA.

When the personal computer requests the central control center CNNT to find a path, the following are entered.

Starting location and personal information (such as ID number of the guide device, etc.)
Whether or not handicapped and what kind of handicap (hearing, sight, legs, etc.)
Intermediate points along the route
Destination location
Advertisement allowed/not allowed information It is also possible to provide the guide device GDA with an Internet communication function, and to request the central control center CCNT directly from the guide device GDA without using a personal computer PC to find a direct path and acquire path information.

Moreover, in the pedestrian support system shown in FIG. 1, local information control devices LCNT are provided, however, these are not absolutely necessary, and it is also possible to construct the system such that direct communication is possible using PLC technology between the central control center CCNT and the tags TG.

Figure 2:
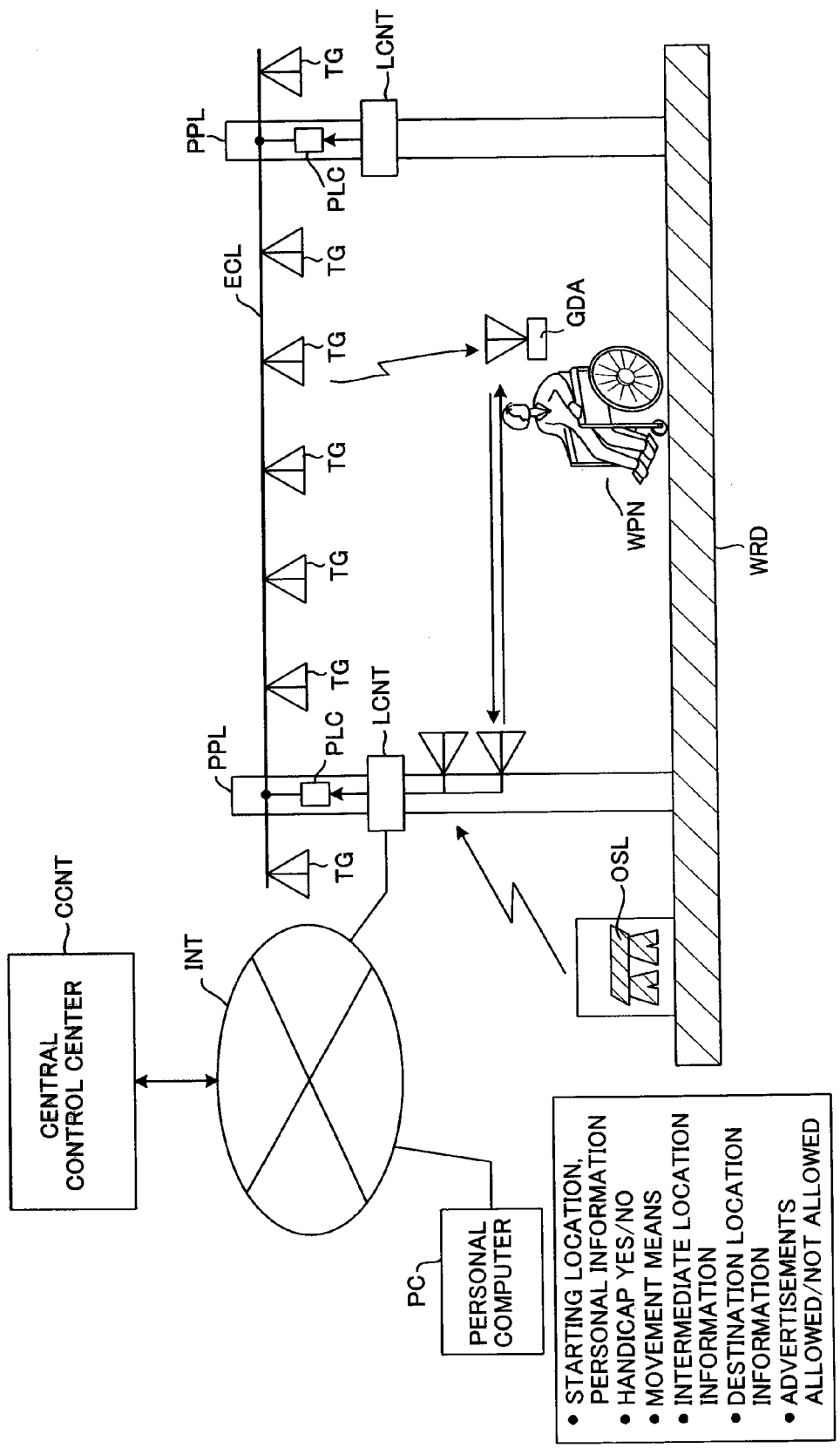
FIG. 2 is another schematic diagram of the pedestrian support device of the present invention.

Furthermore, in FIG. 1, information was written from a local information control device LCNT to a tag using a tag writer, however, as shown in FIG. 2, the system can be constructed such that a PLC unit is connected to the power line ECL and information is written to a tag using PLC technology.

In addition, in FIG. 1 tags are placed on the power line ECL, however, the tags could also be placed on a telephone lines or a CATV line, or when necessary could be placed on the power poles or on the side of buildings.

(B) Central Control Center CCNT

Figure 3:
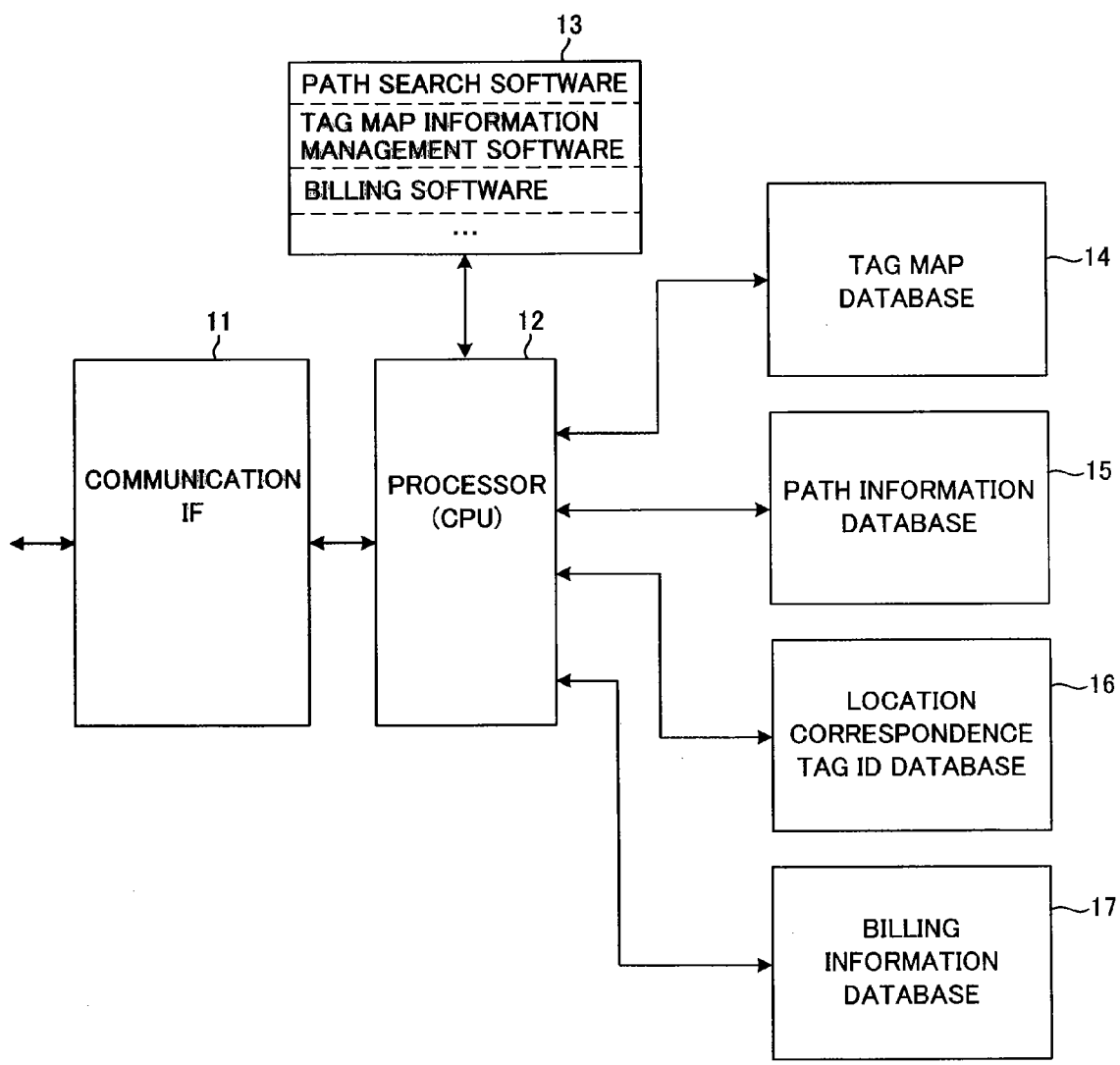
FIG. 3 is a schematic diagram of a central control center CCNT.

FIG. 3 is a schematic diagram of the central control center CCNT, and comprises: an interface (communication IF) 11 for performing Internet communication, a processor (CPU) 12, memory 13 that stores various programs (path search software, tag map information management software, billing software, etc.), a tag map database 14 that comprises tag map information necessary for a path search, a path information database 15 that saves path information that has been found for each user, a location correspondence tag ID database 16 that stores the correspondence between locations on the map of a service area and tag IDs, and a billing database 17 that stores billing data for users to which path information was provided and advertisers.

Figure 4:
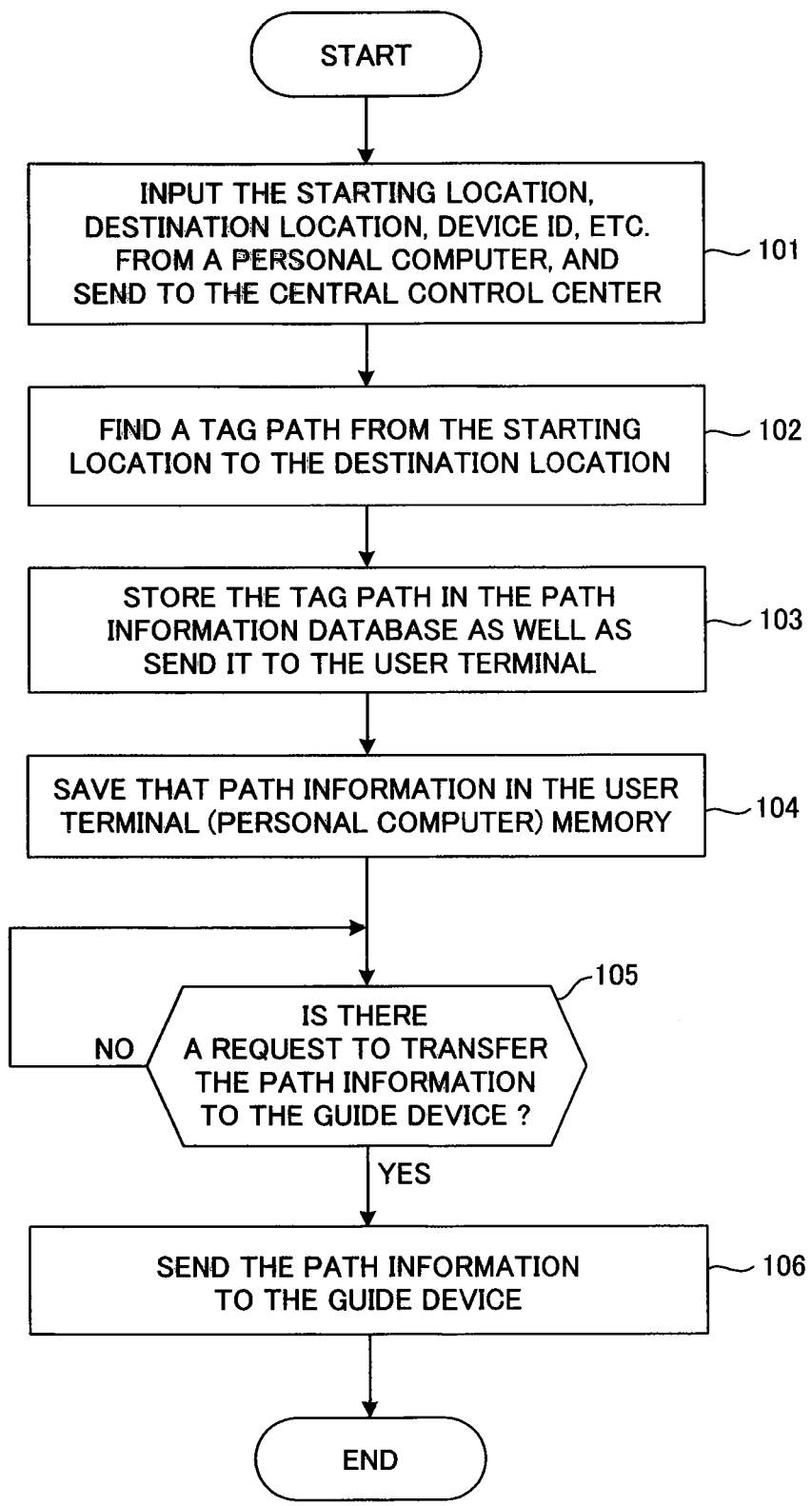
FIG. 4 is a flowchart of the process for finding and distributing path information.

FIG. 4 is a flowchart of the process for finding and distributing path information. When a request for finding and distributing path information is sent via the Internet INT from the pedestrian's personal computer PC (see FIG. 1), the processor 12, through mutual conversation with the personal computer, displays a map of the area for which the service is provided on the personal computer screen and prompts the pedestrian to input the starting location, destination location and intermediate locations. It may be possible to expand a GoogleMap or the like, and using WEB technology that is easy to operate and has good interactive capabilities, the main points of the path can be directly entered on the map using a tablet or the like. Also, the pedestrian is also prompted to enter the device ID of the guide device, whether or not the pedestrian is handicapped, whether or not advertisements are allowed, etc. (step 101). It is also possible to enter the starting location, destination location, names of facilities at intermediate locations, telephone numbers, addresses, etc. without using a map. When public transportation facilities or the like are included in the path, while keeping personal information confidential, a notification of the time at which utilization by a handicapped person is expected can be sent to the office of a facility such as train station or the like, and assistance service can be requested in advance.

Next, the processor 12 references the location correspondence tag ID database 16 and acquires the tag IDs of the inputted starting location, destination location and intermediate locations, and after that, taking into consideration any additional information sent by the user such as whether or not the user is handicapped, references the tag map database 14 and creates the most suitable path information from the starting location via any intermediate locations to the destination location (step 102). The path information is created as a structure consisted of a series of linear lists using the tag IDs of tags that exist along the path of movement from the starting location to the destination location and includes data that indicates the direction of travel. One unit of the linear list structure (see FIG. 5) comprises the tag ID of the tag being focused on (for example No. N) and the tag IDs of the tags (No. N−1, No. N+1) before and after that tag, and left turn/right turn/straight ahead data LRS for the tag being focused on is attached. Here SOP (Start of Path) is the starting location, and EOP (End of Path) is the destination location.

The processor 12 correlates the created path information with the device ID and registers that path information in the path information database 15, as well as distributes it to the personal computer (user terminal) PC (step 103). The personal computer PC saves the distributed path information in the internal memory (step 104), and when the guide device GDA is connected and there is a request to transfer the path information (step 105), sends the path information that is saved in memory to the guide device GDA (step 106).

In the explanation above, tag map information is stored in the tag map database 14, and that tag map information is used to create path information. However, similar to a car navigation system for an automobile, construction is possible in which map information is saved in a map database, a path from the starting location to the destination location is found using that map information, tag IDs of tags that are located along that path are found from the location correspondence tag ID database 16, and path information is created from the tag IDs.

(C) Guide Device

Figure 5:
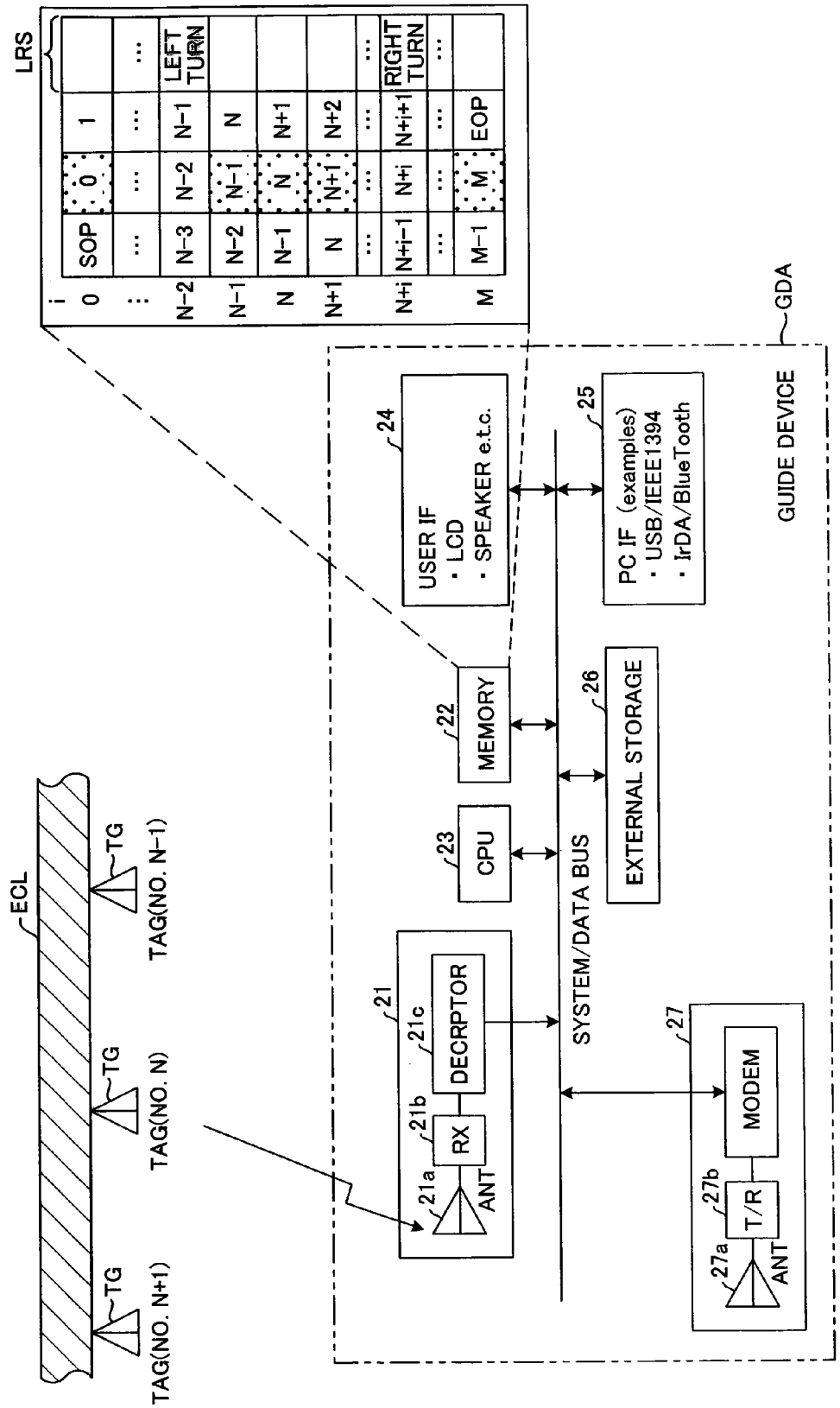
FIG. 5 is a schematic diagram of a guide device GDA.

FIG. 5 is a schematic diagram of the guide device GDA, and comprises: a tag reader unit 21 that is capable of non-contact communication with tags, a memory 22 that stores path information and the rest, a processor (CPU) 23 that identifies where on the path the pedestrian is moving by reference to the tag IDs read from the tag and at least determines the direction to travel in based on the path information, a user interface 24 that comprises a device such as a liquid-crystal display, speaker, a Braille device that stimulates the sense of touch or the like and that notifies the pedestrian of the direction to travel (left turn, right turn, straight) or to cross a street by an arrow display, voice instruction, or by Braille, a personal computer interface (PC IF) 25 such as USB or Bluetooth for acquiring path information from a personal computer, an external memory unit 26 such as a hard disc or memory card, and a radio transmission/reception unit 27 that performs bi-directional communication with a local information control device LCNT.

The tag reader unit 21 comprises: a tag antenna 21a that receives a signal from a tag, a receiving unit 21b and a decoder 21c that decodes received data (including deciphering code). The radio transmission/reception unit 27 comprises a transmission/reception antenna 27a, a transmission/reception unit 27b and a modem 27c.

(D) Local Information Control Device LCNT

Figure 6:
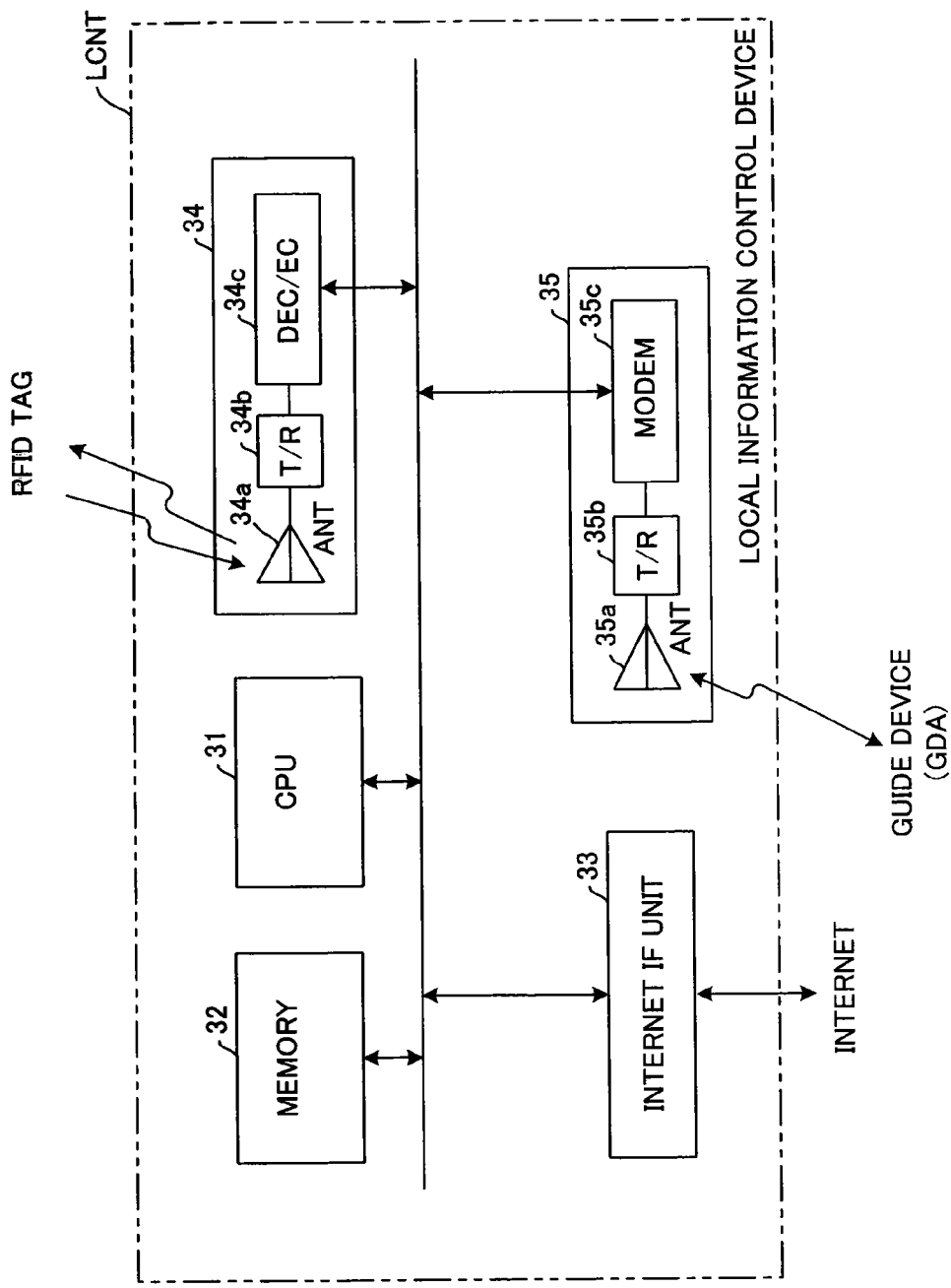
FIG. 6 is a schematic diagram of a local information control device LCNT.

FIG. 6 is a schematic diagram of a local information control device LCNT, and comprises: a processor (CPU) 31, memory 32 that saves various information, a communication interface 33 for performing Internet communication, a tag reader/writer 34 that together with writing information to tags TG according to instructions from the central control center CCNT, reads necessary information from tags that are attached to markers OSL that are placed at construction sites, sites of accidents and the like (see FIG. 1), and a radio transmission/reception unit 35 that performs bi-directional communication with a guide device GDA.

The tag reader/writer 34 comprises: an antenna 34a that transmits signals to or receives signals from tags TG, a transmission/reception unit 34b, a decoder/encoder 34c that decodes received data and encodes transmission data (hereafter, the decoder/encoder will be presumed to also perform encryption and decryption). The radio transmission/reception unit 35 comprises: a transmission/reception antenna 35a, transmission/reception unit 35b and a modem 35c.

Figure 7:
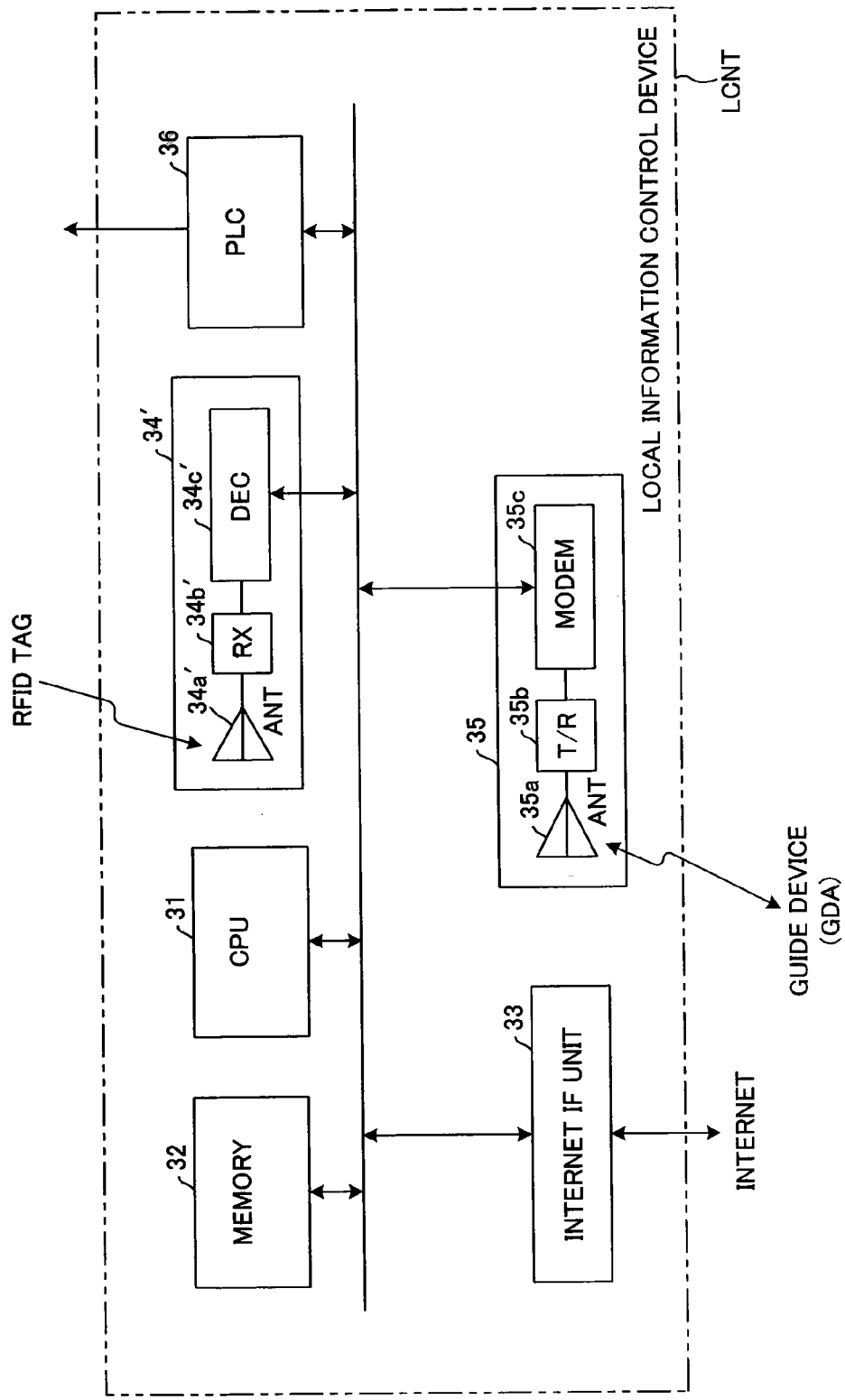
FIG. 7 is another schematic diagram of a local information control device.

FIG. 6 shows construction for writing information from the tag reader/writer 34 to a tag TG, however, as shown in FIG. 7, it is also possible to write using a PLC unit 36. In this case, a tag reader 34' is provided in the place of the tag reader/writer 34. The tag reader 34' comprises: an antenna 34a', a reception unit 34b', and decoder 34c' that decodes received data.

(E) Tag TG

Figure 8:
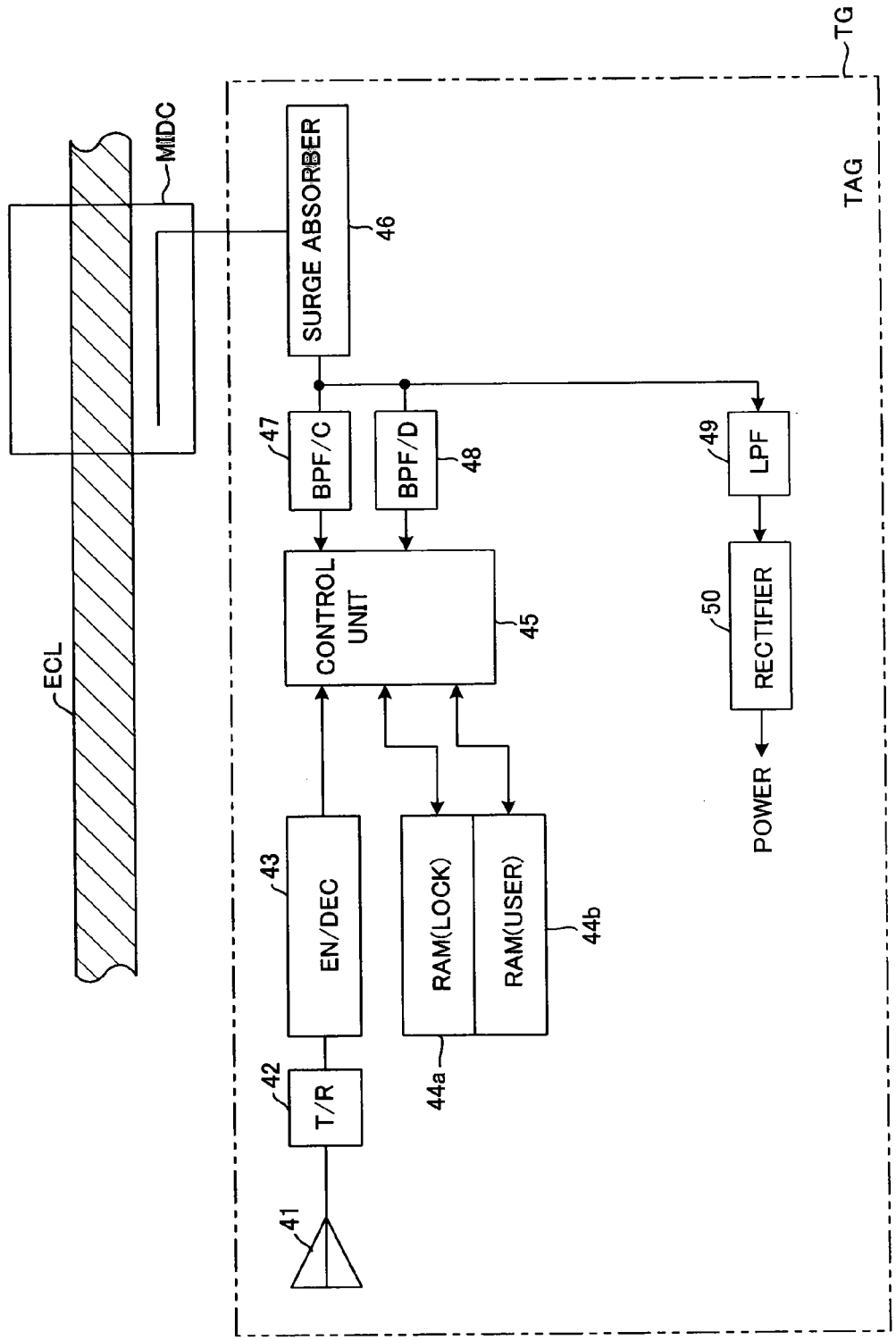
FIG. 8 is a schematic diagram of a tag TG.

FIG. 8 is a schematic diagram of a tag TG, and comprises: a tag antenna 41 that transmits signals to or receives signals from an external tag reader or tag writer, a transmission/reception unit 42, a decoder/encoder 43 that decodes received data and encodes transmission data, RAM 44a, 44b that store information, a control unit 45 that controls reading and writing of information, a surge absorber 46 that acquires a transmission signal that passes over a power line from a mutual electromagnetic induction coupler MIDC and absorbs a surge wave that is contained in the signal, a band-pass filter 47 that gets through only the control signal that is a first frequency component, a band-pass filter 48 that gets through only a data signal that is a second frequency component, a low-pass filter 49 that gets through only the low frequency component, and a rectifier 50 that rectifies a low-frequency signal and supplies power to each unit.

The first RAM 44a is an information storage area in which, unless instructed by a specified manager (for example, the central control center), rewriting is prohibited. The control unit 45 has a security function, and when there is a write/read request, it checks whether a preset keyword (password) has been input, and only when the input was valid the control unit 45 makes the first RAM 44a to be accessed. The tag IDs, for example, are stored in this first RAM 44a. The second RAM 44b is a storage area that can be rewritten to from the outside using a specified tag writer by an enterprise, such as a sponsor (advertiser) or the like, that satisfies certain specified conditions, and it stores audio data for advertisements (promotional ads), etc. The second memory can store key data for displaying advertisement information on a GDA. In this case the advertisement information is uploaded with path information to the storage area of the GDA of a user that allowed advertisements at the start of usage and GDA displays the advertisement information when said key data which indicates the advertiser is read from a tag.

By having the first and second RAM 44a, 44b described above, it is possible to provide a pedestrian with advertisements of an enterprise or shop while at the same time not losing the security of the basic service of the system due to pranks or the like, as well as it is possible to have enterprises along a path burden some of the cost for installing the system.

(F) Path Guidance Control

Figure 9:
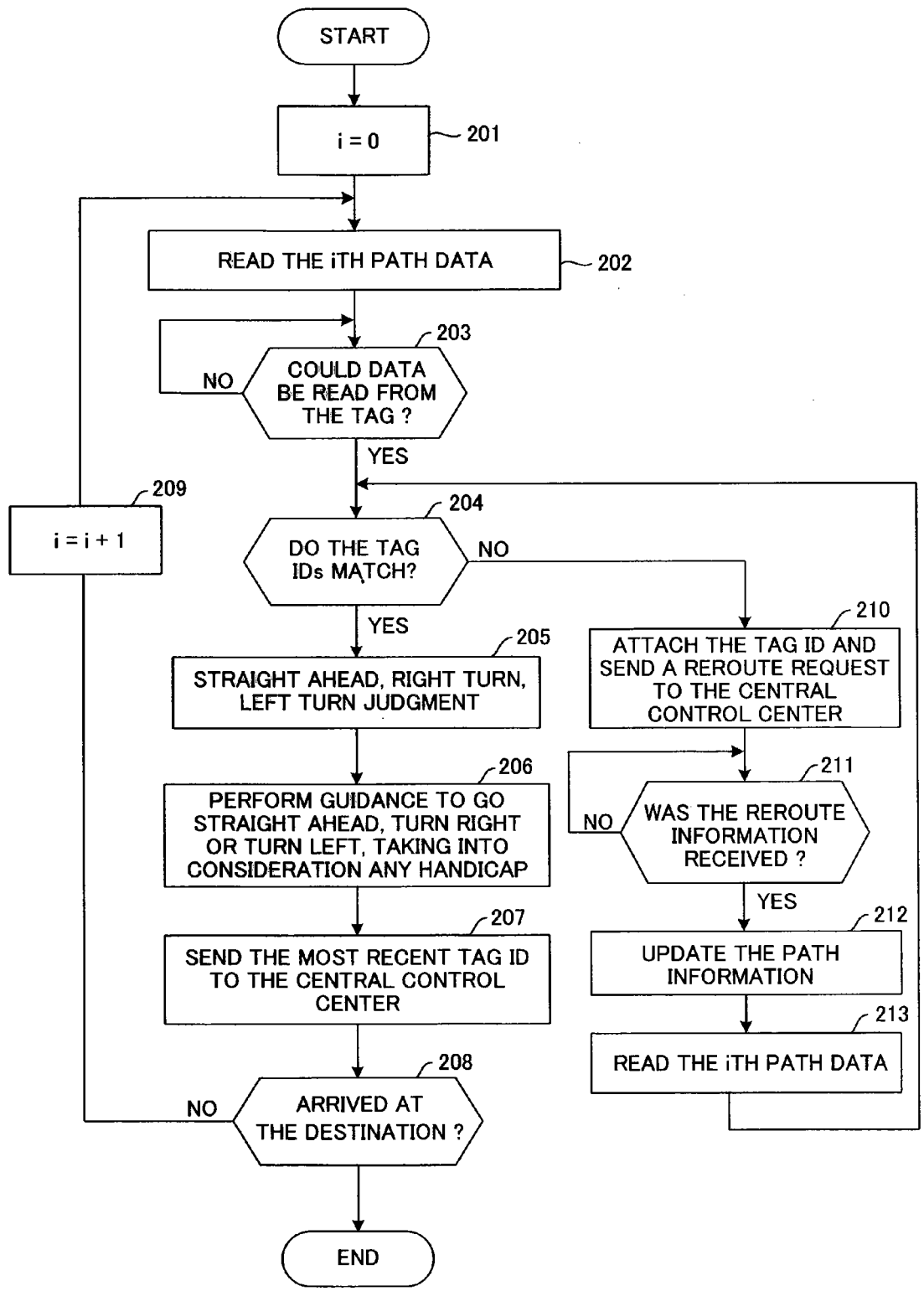
FIG. 9 is a flowchart of the processing by the guide device GDA when performing path guidance control to guide a pedestrian along a path using path information that is set in memory.

FIG. 9 is a flowchart of the control process for path guidance by the guide device GDA (see FIG. 5) that guides a pedestrian using path information that is set in memory.

The processor 23 of the guide device GDA first initializes a path data counter i as i=0 (step 201), then reads the $i^{th}$ path data from memory 22 (step 202). The processor 23 estimates that the center tag ID of the $i^{th}$ path data is supposed to be the tag ID that is actually read from the next tag TG.

Next, the processor 23 checks whether the tag ID was read from the tag (step 203), and when the tag ID has been read, checks whether the estimated tag ID matches the tag ID that is actually read from the tag TG (step 204), and when they match, references the left turn/right turn/straight data that is included in the $i^{th}$ path data to determine whether to turn right, turn left or go straight from the current location (step 205).

In the case of a right turn or left turn, the processor 23 references the type of handicap information about the pedestrian that is attached to the path information, and when the pedestrian has a loss of sight, performs direction guidance using an audio instruction, "The direction is right (or left)", at a high volume from the speaker of the user interface 24 (in the case of touch stimulation, applies a stimulation to the hand of the direction the turn is to be made by a mechanism such as a Braille device), and when the pedestrian has a loss of hearing displays a large flashing arrow on the liquid-crystal display of the user interface 24 indicating the direction of travel, as well as displays in large letters "The direction is right (or left)" (step 206). In the case of moving straight ahead, it is possible to perform guidance to go straight ahead after a specified number of times without performing constant guidance. Also, in the case of crossing a road, guidance is performed by providing an audio instruction or visual display "Cross the road".

After the guidance process described above, the processor 23 sends the tag ID that was read in step 203 to the local information control device LCNT from the radio transmission/reception unit 27, and via that local information control device LCNT, sends the read tag ID to the central control center CCNT (step 207). The central control center CCNT correlates that tag ID with the device ID of the guide device and saves that tag ID, suitably notifies the family personal computer or a mobile telephone of the movement status.

After that, the processor 23 checks whether the pedestrian has reached the destination location (step 208), and when the pedestrian has reached the destination location processing ends, however when the pedestrian has not yet reached the destination location, increases i (i=i+1, step 209), and returns to the processing starting from step 202.

On the other hand, in step 204 when the estimated tag ID does not match the tag ID that was actually read from the tag TG, the processor 23 sends a reroute request message to the central control center CCNT via a local information control device LCNT (step 210). The tag ID that is read in step 203 and the device ID of the guide device GDA is attached to this reroute request message.

The central control center CCNT identifies the destination location from the notified device ID, and finds a new path from the current location of the notified tag ID to the destination location, then sends the difference between the old path information and the new path information to the guide device GDA via the local information control device LCNT. After receiving the aforementioned difference, which is the reroute path information, (step 211), the processor 23 updates the old path information that is stored in the memory 22 (step 212), reads the $i^{th}$ path data from the updated new path information and repeats the processing starting from step 204.

Figure 10:
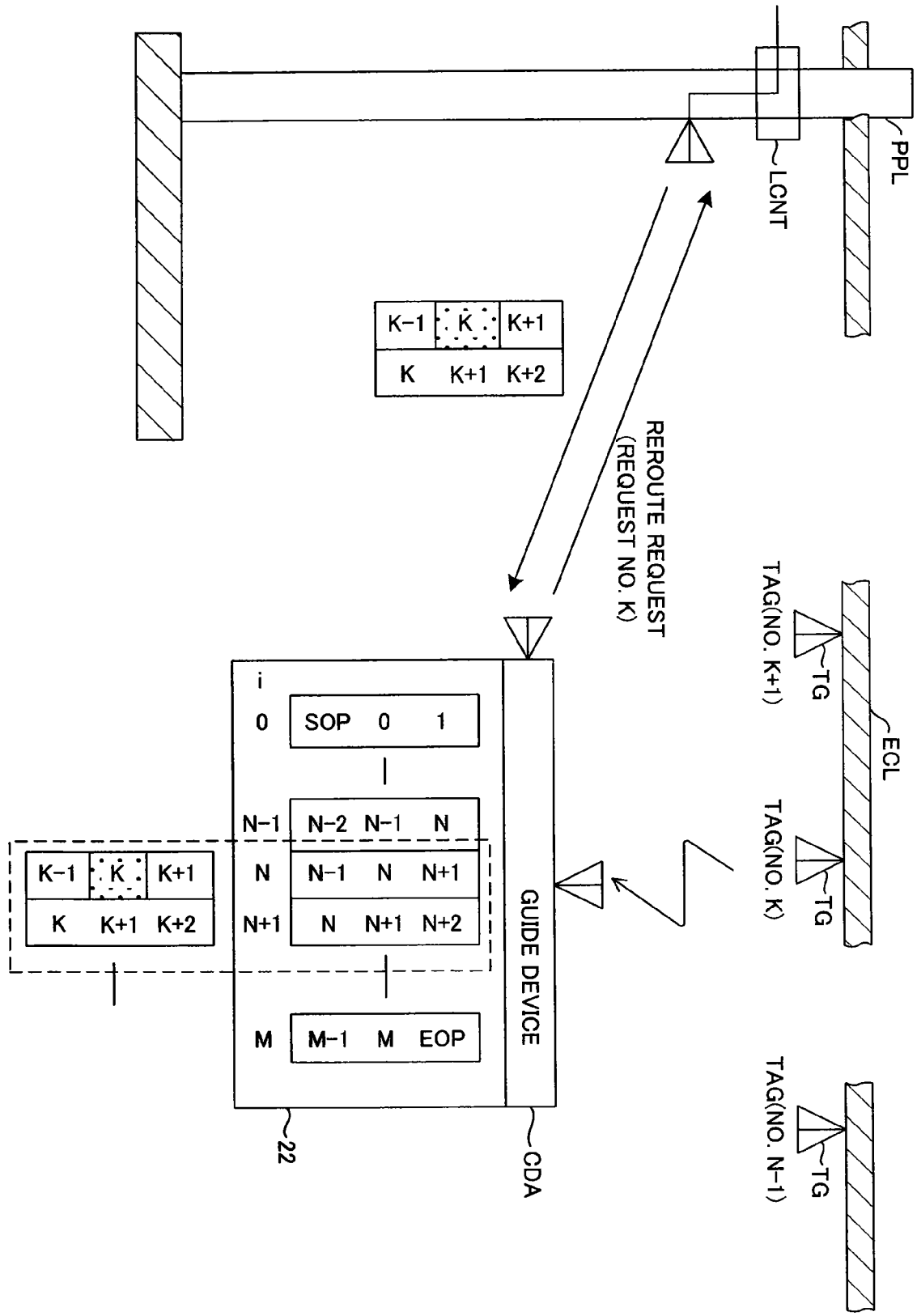
FIG. 10 is a drawing explaining control when a tag ID that was estimated from the path information does not match a tag ID that is actually read from a tag TG.

FIG. 10 shows control in the case where the tag ID (No. N) that is estimated from the path information when i=N and the tag ID (No. K) that is actually read from a tag TG do not match. In that case, the guide device GDA sends a reroute request (includes the tag ID (No. K) that is read from a tag TG and the device ID of the GDA) to the central control center CCNT via the local information control device LCNT. The central control center CCNT finds a new path based on the request and sends the difference between the old path information and new path information to the guide device GDA via the local information control device LCNT. The guide device GDA receives the difference data and updates the old path information.

(G) Map Update Control when Construction, an Accident or the Like is Detected

Figure 11:
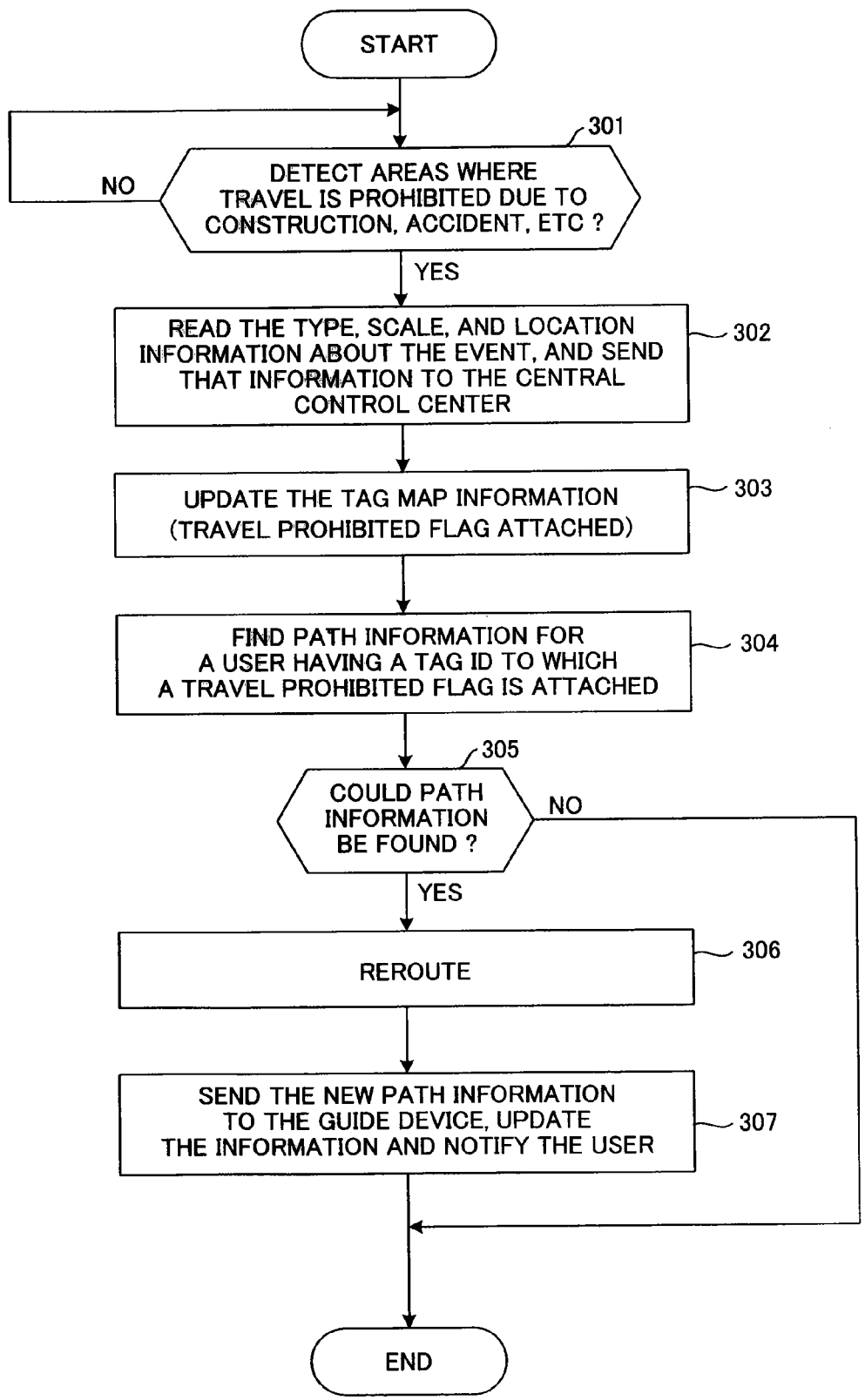
FIG. 11 is a flowchart of the control process when updating the path map when construction work or an accident is detected.

FIG. 11 is a flowchart of the map update control process when construction, an accident or the like is suddenly detected, and the predetermined route should be modified.

When the local information control device LCNT detects from a tag that is built into a marker OSL (see FIG. 1) that there is construction, an accident or the like (step 301), it reads information such as the type, scale, location of the event from that tag, and sends that information to the central control center CCNT (step 302). The central control center updates the tag map information based on that information (step 303). For example, the center control center CCNT adds a travel-prohibited flag to the tag ID that corresponds to the part of the sidewalk that can no longer be used.

Next, the central control center CCNT searches for the path information that is provided to the user and that includes a tag ID to which a travel-prohibited flag has been attached (step 304), and when such a path information is found, searches for a new path that will go around the part of the sidewalk that corresponds to that tag ID (reroute, step 306) and sends the difference between the old path information and the new path information to the guide device GDA via the local information control device LCNT. The guide device GDA updates the path information based on the difference data, and notifies the pedestrian (including family or the like for which a separate notification request has been set) that there was a path change (step 307).

(H) Billing Process

Figure 12:
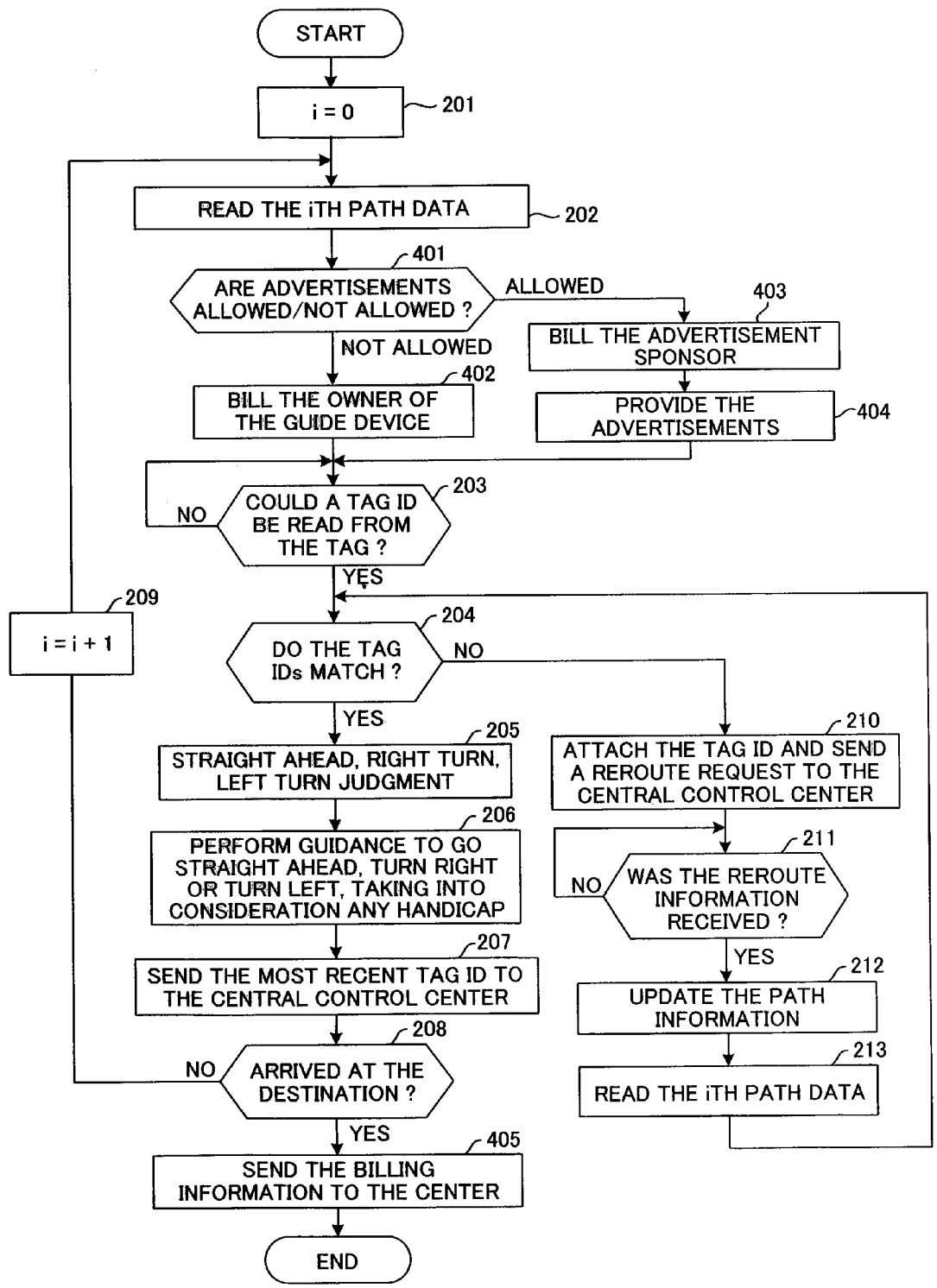
FIG. 12 is a flowchart for the control process when performing path guidance that includes a billing process.

In the flowchart of the process for controlling path guidance shown in FIG. 9, a process which provides advertisements (promotional ads) stored in the RAM 44b of a tag TG was not explained. However, as shown in FIG. 12 it is possible to add a process for providing advertisements (promotional ads) and a billing process to the flowchart shown in FIG. 9.

In other words, in step 202, when stored data is read from a tag TG, the processor 23 of the guide device GDA references the advertisement allowed/not allowed data (added to the path information) to find whether or not providing advertisements by a tag TG is allowed (step 401), and when advertisements are not allowed, by adding a set amount (unit cost defined per a tag) to the billed total T1 (initial value is 0) of the owner of the guide device, the owner of the guide device is billed for the cost to provide the path information (step 402), after which processing is performed starting from step 203. On the other hand, when advertisements are allowed, by adding a set amount (unit cost defined per a tag) to the billed total T2 (initial value is 0) of the advertisement sponsor, the processor 23 of the guide device GDA bills the advertisement sponsor for the cost to provide the path information (step 403), and provides the advertisement that was read from a tag (or when using an advertisement provision key, the advertisement that was read from the memory of the GDA) (step 404), after which performs processing starting from step 203. In addition, after the pedestrian reaches the destination location, the processor 23 sends the billing information to the central control center CCNT via the local information control device LCNT (step 405), and the central control center CCNT updates the billing database (FIG. 3). Either one of the two above billing models may be applied separately or by mixture.

The explanation above is for the case when billing is processed by the guide device and reported to the central control center CCNT, however, as shown in FIG. 13, the billing process can also be performed by the central control center CCNT when creating the path information. However, information indicating which sponsor's advertisements are stored in each tag must be registered in the location correspondent tag ID database 16.

In FIG. 13, when creating the path information (step 501), the processor 12 of the central control center CCNT checks in which areas of the path (of course this could also be for the entire path) providing advertisements is allowed (step 502), and bills the owner of the guide device for the cost of providing the path information for areas where advertisements are not allowed (step 503), then updates the billing database (step 504). The cost for providing the path information is calculated by multiplying the number of tags that make up the path information by the unit cost per tag. On the other hand, in step 502, when advertisements are allowed, the processor 12 calculates the number of tags that include a sponsor's advertisement for each advertisement sponsor, and bills each advertisement sponsor according to the respective number of tags, and bills the owner of the guide device for tags with no advertisements (step 505), then updates the billing database (step 504). Billing for guide devices with no advertisements could also be charged to the local government, etc.

ADVANTAGES OF THE INVENTION

With the present invention, tags are placed on power cables or the like above a sidewalk, so it is possible to provide support to a pedestrian by reading the signals from the tags even when there are signboards, parked bicycles or the like along the sidewalk.

With the present invention, by creating path information having tag IDs that are arranged in the order of the tags along the path to the destination location, and setting that path information in a guide device that is in the possession of a pedestrian, it is possible to guide the pedestrian to the destination location while referencing this path information and the tag IDs that are read from tags that are placed on the power cable.

With the present invention, when an obstacle occurs along the sidewalk being traveled due to construction, an accident or the like, the tag map at the central control center is updated by detecting this obstacle, and it is possible to provide the guide device with path information that is based on the latest sidewalk information.

With the present invention, when a tag ID that is estimated from the path information differs from a tag ID that is actually read from a tag, by finding a new path to the destination and setting that new path information in the guide device, it is possible to guide the pedestrian to the destination location even though a mistake is made in the direction of travel along the way.

With the present invention, by billing an advertiser for part of the cost for providing path information for areas where the guide device allows advertisements that are recorded in tags (or the GDA), and by billing the owner of a guide device for the entire cost for providing path information for areas where the guide device does not allow advertisements, it becomes possible for the enterprise to recover part of the cost for installation of the system. In other words, both the user and the service provider can share in the burden of improvement costs of the infrastructure for realizing a barrier-free ITS (Intelligent Transporting System) environment.

What is claimed is:

1. A pedestrian support system that supports the movement of a pedestrian using tags, comprising:
    a plurality of tags having an information storage unit and that are placed on cables that extend over a path being traveled;
    a guide device, having an ID by which a central control device (terms described below) can uniquely identify the guide device, that is held by a pedestrian and is capable of non-contact communication with said tags;
    an input device that inputs a starting location and a destination location: and
    a central control device that includes a database in which correspondence between the location of each of the tags and tag ID of the tag is recorded, a database in which tag map information is recorded so that the path information from the starting location to the destination location is created using the tag IDs, and a processing unit that uses the correspondence when the starting location and the destination location are input, to obtain the tag IDs of the starting location and the destination location and uses the obtained tag IDs and the tag map information to create the path information having tag IDs that are arranged in the order of tags that are along a path from the starting location to the destination location and directly or indirectly sets that path information in said guide device; wherein
    each of said tag IDs in the path information includes the direction of travel to the destination location, and
    said guide device reads tag IDs from said tags and compares those tag IDs with the tag IDs in said path information in order to identify where on the path the pedestrian is moving, then provides information to support the movement of the pedestrian based on that path information.

2. The pedestrian support system of claim 1 wherein said guide device comprises:
    a tag reader unit that is capable of non-contact communication with said tags;
    path information memory that stores said path information;
    a control unit that references tag IDs that are read from said tags, identifies at what location in the path information the pedestrian is walking, and at least determines the direction in which the pedestrian should go based on the path information; and
    a unit for providing the pedestrian with the direction to travel in.

3. The pedestrian support system of claim 1, wherein said central control device uses the tag IDs of the tags along a path from a starting location to a destination location to create path information having linear list structure, and includes data in that path information indicating the direction in which to travel.

4. The pedestrian support system of claim 1,
    wherein when handicap information about the owner of the guide device is input together with the destination location information, said central control device creates path information that takes into consideration said handicap.

5. The pedestrian support system of claim 4,
    wherein said guide device sends tag IDs that are read from said tags to said central control device, and that central control device manages the location of the pedestrian and communicates the location of the pedestrian by e-mail to a separately set terminal.

6. The pedestrian support system of claim 1, further comprising
    local information control devices that are placed on constructs such as power poles along a sidewalk, and that act as a go-between for communication between said central control device and the tags, and between said central control device and guide device.

7. The pedestrian support system of claim 6, wherein said local information control device comprises:
    a tag reader/writer unit that is capable of non-contact communication with said tags; and
    a radio communication unit that is capable of bi-directional communication with said guide device.

8. The pedestrian support system of claim 6, wherein when said cable is a power line,
    said local information control device comprises:
    a power line communication unit that transmits information to a specified tag over the power line; and
    a radio communication unit that is capable of bi-directional communication with said guide device.

9. The pedestrian support system of claim 6, wherein said local information control device reads information such as the type, scale, location information about an event from a tag that is built into a marker that is placed at a construction site, accident site or the like and notifies the central control device of that information; and said central control device updates the tag map information based on that information.

10. The pedestrian support system of claim 9, wherein when there is path information that includes a tag ID for the location of said construction site, accident site or the like, said central control device creates a path that goes around that location, and sends the difference between the old path information and new path information to the guide device via said local information control device; and said guide device updates the path information that it has based upon said difference.

11. The pedestrian support system of claim 1, wherein said guide device estimates the next tag ID from said path information, and when this estimated tag ID differs from the tag ID that is actually read from a tag, attaches the read tag ID and requests the central control device to reroute the path;

said central control device finds a new path from the location of the notified tag ID to the destination location and sends the difference between the old path information and new path information to the guide device; and said guide device updates the path information that it has based on that difference.

12. The pedestrian support system of claim 1, wherein said tag comprises two information storage areas such that information is written to the first information storage area that stores the tag ID and the like via a security means, and data from the outside is written to the second information storage area using a specified tag writer.

13. The pedestrian support system of claim 12, wherein control is performed such that advertisement information or key information that allows advertisements is recorded in the second information storage area of said tag, and when passing through an area where advertisements are allowed, said guide device reads the advertisement information from that second information storage area of that tag and provides the advertisement information to the pedestrian, and when passing through an area where advertisements are not allowed, said guide device does not provide advertisement information to the pedestrian; and said central control device comprises a billing data base that records billing data for billing the owner of the guide device and the advertiser for the cost of providing path information, and bills the advertiser for part of the cost for providing path information for areas where the guide device allows advertisements, and bills the owner of the guide device for the entire cost for providing path information for areas where the guide device does not allow advertisements.

* * * * *